No. 621,833. Patented Mar. 28, 1899.
S. L. LONG.
TRAP.
(Application filed Mar. 14, 1898.)
(No Model.)

Witnesses:—
Louis M. Whitehead
J. J. Riley

Sidney L. Long, Inventor:—
By his Attorneys,
C. A. Snow & Co.

THE NORRIS PETERS CO., PHOTO-LITHO., WASHINGTON, D. C.

UNITED STATES PATENT OFFICE.

SIDNEY L. LONG, OF MAGNOLIA, MINNESOTA.

TRAP.

SPECIFICATION forming part of Letters Patent No. 621,833, dated March 28, 1899.

Application filed March 14, 1898. Serial No. 673,826. (No model.)

*To all whom it may concern:*

Be it known that I, SIDNEY L. LONG, a citizen of the United States, residing at Magnolia, in the county of Rock and State of Minnesota, have invented a new and useful Trap, of which the following is a specification.

The invention relates to improvements in traps.

The object of the present invention is to improve the construction of traps and to provide a simple and comparatively inexpensive one adapted for birds and other animals and capable of killing its victims and of automatically setting itself for a series of successive discharges.

A further object of the invention is to provide means for removing an animal quickly from the trap after it has been killed, so that the trap will not betray to other members of the species of animals killed any evidences of such killing, so that animals will not be warned after the trap has been in operation.

The invention consists in the construction and novel combination and arrangement of parts, as hereinafter fully described, illustrated in the accompanying drawings, and pointed out in the claims hereto appended.

Figure 1:
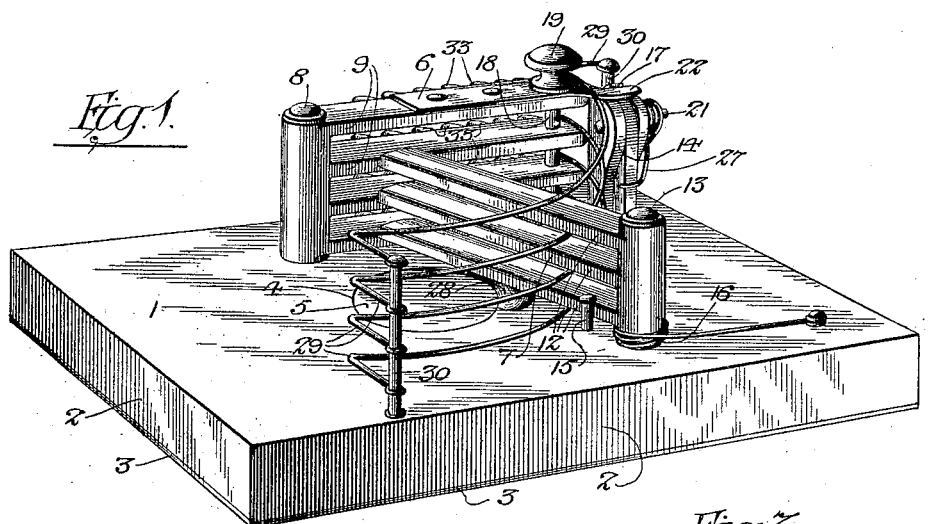
Figure 2:
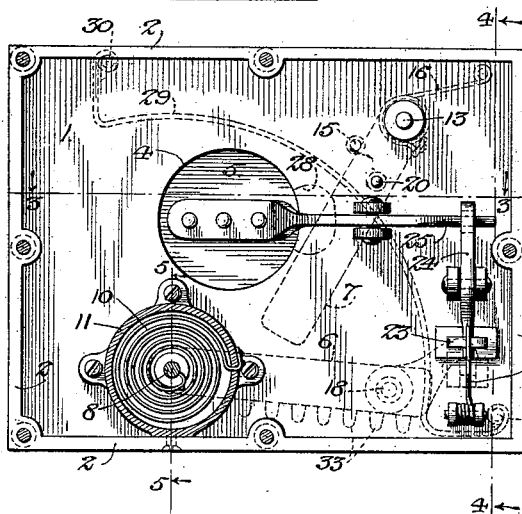
Figure 3:
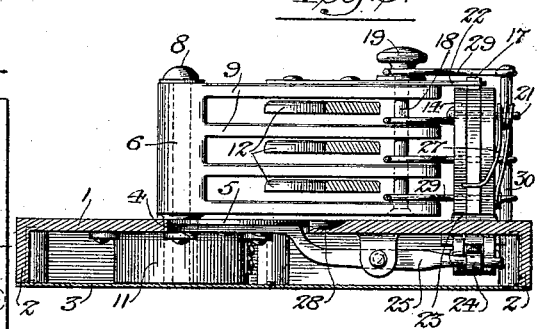
Figure 4:
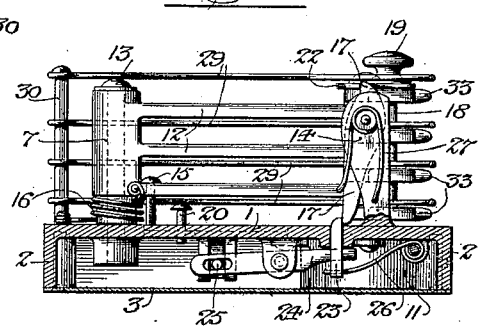
Figure 5:
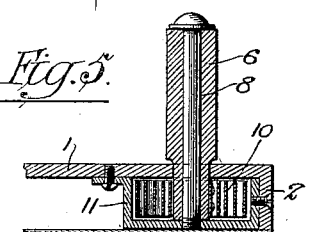

In the drawings, Figure 1 is a perspective view of a trap constructed in accordance with this invention. Fig. 2 is a reverse plan view, the bottom of the casing being removed and the barrel-spring casing being in section. Fig. 3 is a sectional view on the line 3 3 of Fig. 2. Fig. 4 is a similar view on the line 4 4 of Fig. 2. Fig. 5 is a vertical sectional view illustrating the manner of mounting the rotary striking-frame.

Like numerals of reference designate corresponding parts in all the figures of the drawings.

1 designates a rectangular base, preferably hollow and constructed of metal, as shown, although it may be made solid and of wood or any other suitable material. The base, which is provided with marginal walls or flanges 2, has a removable sheet-metal bottom plate 3, and it is provided with a substantially centrally-arranged opening 4 to receive a depressible plate or treadle 5, which is adapted to trip a rotary striking-frame 6, arranged to swing horizontally and adapted to strike an animal and crush the same between it and an oscillating frame 7 and throw the animal off the trap.

The rotary striking-frame, which is mounted on a vertical shaft or spindle 8, is provided with a series of parallel horizontal bars 9 and is connected with one end of a barrel-spring 10, and the latter, which is housed within a cylindrical casing 11, is suitably secured to the same. The barrel-spring, which may be of any desired length, is adapted to actuate the striking-frame 6, which is designed to make a series of successive rotations, so that the trap will be reset after each operation until the barrel-spring requires rewinding. The cylindrical casing, which is suitably secured to the base of the trap, is provided with a central threaded socket to receive the lower end of the shaft or spindle 8 of the rotary striking-frame. The oscillating frame 7 is provided with a series of parallel horizontal bars 12, arranged opposite the intervals between the bars 9 of the rotary frame, so that the bars of the two frames are adapted to pass between each other. The said oscillating frame, which is mounted upon a shaft or spindle 13, has its swing limited by a trigger-frame 14 and a stop 15, it being normally held against the latter by a spring 16. The spring 16 actuates the oscillating frame, and when the trap is sprung the rotary striking-frame, which is actuated by the barrel-spring, swings around backward away from the front of the trap and strikes an animal, crushing the same between it and the oscillating frame and throwing the animal off the base of the trap before the victim has time to bleed or leave any other evidence of his death on the trap. After the animal is thrown off the trap by the rotary striking-frame the operating-frame, which is swung backward by the striking-frame, is returned to its normal position by the spring 16.

When the barrel-spring becomes too weak to kill an animal and throw the same off the trap and return the striking-frame to its initial position, the striking-frame remains at the trigger-supporting bracket, the spring of the trigger being of sufficient strength to hold the striking-frame in such position when the barrel-spring is in this condition.

The bars 9 of the rotary striking-frame are connected near their outer ends by a vertical rod 18, adapted to engage the bars of the oscillating frame in order that the latter may be swung backward positively, and a knob or handle 19 is secured to the upper end of the rod 18 and is adapted to be grasped in rotating the striking-frame to wind up the spring, and in rewinding the spring the oscillating frame is held out of the way by a stop-pin 20, mounted on the base and adapted to be drawn outward to hold the oscillating frame out of the path of the rod 18.

The trigger-supporting bracket 14 is mounted on the base and is provided at its top with perforated ears, through which passes a pin 21, forming the pivot of the trigger. The trigger is pivoted at a point between its ends, and its upper end is adapted to engage an arm 22, extending outward horizontally from the rotary striking-frame. The lower end of the trigger abuts against a depressible arm 23 of a lever 24, fulcrumed between its ends within the hollow base of the trap and connected with a lever 25, which carries the said treadle. The depressible arm 23 is located at one end of the lever 24, and the other end of the latter is provided with an opening to receive the lever 25, which is arranged at right angles to the lever 24, and the said arm 23 is held normally elevated in position for engagement with the trigger by means of a spring 26. When the treadle is depressed, the arm 23 is simultaneously carried downward, thereby releasing the lower end of the trigger, and the pressure of the spring-actuated striking-frame on the upper end of the trigger swings the latter against the action of a spring 27, which returns the trigger quickly to its normal position back of the depressible arm 23 before the treadle is relieved of the pressure of the animal. The spring which returns the trigger to its normal position consists of a coil arranged on the pivot of the trigger and arms formed by the terminals of the coil, one arm being secured to the trigger-supporting bracket and the other arm engaging the lower portion of the trigger. The levers 24 and 25, which are mounted within the hollow base, are fulcrumed on suitable lugs arranged in pairs and disposed on opposite sides of the levers.

The base is provided adjacent to the treadle with a bait-recess 28, and in order to prevent animals from approaching the bait except by way of the treadle the trap is provided with a curved guard 29, consisting of a series of curved wires having their terminals bent outward at an angle, as shown, and secured to vertical posts or supports 30. The bars of the frames 6 and 7 operate between the parallel series of rods of the guard, and the latter causes an animal to approach the bait in the path of the striking-frame. A bait also may be suspended over the treadle, and as an animal is never able to obtain the bait until after the trap is run down the trap after being once baited does not have to be rebaited until it is rewound.

The yieldingly-mounted or spring-actuated oscillating frame besides coöperating with the striking-frame to crush an animal serves to cushion the striking-frame and check the same before it reaches the trigger to prevent the striking-frame from contacting with the trigger with sufficient force to injure the same.

In order to render the trap more effective and to insure a positive killing each time an animal is struck, the bars of the striking-frame are provided at their contact edges with dull projections or pins 33, extending outward horizontally from the striking-frame.

The invention has the following advantages: The trap is simple, inexpensive, strong and durable, and is positive and reliable in operation, and it is capable of a series of successive discharges and is adapted to kill an animal and throw the same off of it, so that it will not betray any evidences of such killing.

Changes in the form, proportion, and minor details of construction may be resorted to without departing from the spirit or sacrificing any of the advantages of this invention.

What I claim is—

1. In a trap, the combination of a base, a rotary striking-frame, means for setting and tripping the striking-frame, and an oscillating frame arranged to be engaged by the striking-frame, substantially as described.

2. In a trap, the combination of a base, a rotary striking-frame, means for setting and tripping the same, an oscillating frame arranged to be engaged by the striking-frame, and a guard arranged to direct an animal in the path of the striking-frame, substantially as described.

3. In a trap, the combination of a base, a rotary striking-frame provided with a series of parallel bars, a spring-actuated oscillating frame, and a curved guard adapted to direct animals in the path of the striking-frame and composed of a series of wires or rods receiving the bars of said frame between them, substantially as described.

4. In a trap, the combination of a base, a horizontally-rotating striking-frame, an oscillating frame arranged to be engaged by the striking-frame, a substantially vertical trigger pivoted between its ends and having its upper end engaged by the striking-frame, a lever located beneath the striking-frame and having an arm engaging the lower end of a trigger, and a treadle arranged in the path of the striking-frame and connected with the said lever, substantially as described.

5. In a trap, the combination of a base, a rotary striking-frame, a substantially vertical trigger having its upper end engaged by the striking-frame, a lever 24 having an arm engaging the lower end of the trigger, a lever 25 arranged at an angle to the lever 24 and provided with a treadle located in the path of the striking-frame, and springs engaging the lever 24 and the trap, substantially as described.

6. In a trap, the combination of a base, a rotary striking-frame, a barrel-spring mounted on the base, connected with the striking-frame and adapted to actuate the same, said spring being also adapted to be rewound by rotating the striking-frame in the opposite direction, an oscillating frame, a spring for actuating the frame, stops for limiting the movement thereof, and means for setting and tripping the striking-frame, substantially as described.

7. In a trap, the combination of a base, a rotating striking-frame provided with parallel bars and having a connecting-rod near their outer ends, an oscillating frame composed of parallel bars arranged opposite the intervals between the bars of the striking-frame and adapted to be engaged by the connecting-rod, and means for setting and tripping the striking-frame, substantially as described.

8. In a trap, the combination of a spring-actuated oscillating frame, and a rotary striking-frame arranged to crush an animal between it and the oscillating frame, and to throw the animal off the trap, substantially as described.

9. In a trap, the combination of a yieldingly-mounted oscillating frame, and a movable striking-frame, arranged to crush an animal between it and the oscillating frame and to throw the said animal off the trap, substantially as described.

In testimony that I claim the foregoing as my own I have hereto affixed my signature in the presence of two witnesses.

SIDNEY L. LONG.

Witnesses:
P. PHINNEY,
HENRY KLEINE.